Sept. 15, 1953  F. E. TUTTLE  2,651,866
DISPLAY SIGN AND METHOD OF MAKING THE SAME
Filed July 18, 1950  2 Sheets-Sheet 1

FORDYCE E. TUTTLE
Inventor

By Daniel J. Mayne

Attorneys

Sept. 15, 1953             F. E. TUTTLE             2,651,866

DISPLAY SIGN AND METHOD OF MAKING THE SAME

Filed July 18, 1950                                                 2 Sheets-Sheet 2

FORDYCE E. TUTTLE
Inventor

By Daniel J. Mayne

Attorney

Patented Sept. 15, 1953

2,651,866

UNITED STATES PATENT OFFICE 2,651,866

DISPLAY SIGN AND METHOD OF MAKING THE SAME

Fordyce E. Tuttle, Rochester, N. Y., assignor to Eastman Kodak Company, Rochester, N. Y., a corporation of New Jersey Application July 18, 1950, Serial No. 174,394

10 Claims. (Cl. 40—132)

The present invention relates to advertising display signs and particularly to an improved sign of this type which is a transparency adaptable to large-size reproduction and the method of making the same.

The primary object of the present invention is to provide a transparency which is so constructed that it can be made in very large sizes so as to be suitable for so-called outdoor or billboard advertising displays which are usually viewed from appreciable distances.

A further object is to provide a display in the form of a transparency which is adapted for providing a changeable display; it is so constructed that the display can be readily changed without requiring the use of heavy or specialized equipment, or skilled personnel, and which has sufficient available light to make it visible in daylight.

Another object is to provide a display of the type set forth which comprises a plurality of individual, elongated, narrow film strips, each constituting a transparency representative of an elongated elemental part of the complete display, and which film strips are arranged in side-by-side parallel relation in a common viewing plane in front of a source of illumination so that, when viewed simultaneously, the elemental parts of the complete image of the display, carried by the several film strips, combine to produce a composite type complete display.

And, still another object is to provide a display sign of the type set forth wherein the individual film strips are supported in the viewing plane by strip guides which permit the individual strips to be readily placed in, or removed from, the sign for purposes of changing the display, and/or replacing a defective portion thereof.

And, another object is to provide a display sign of the type described wherein the supporting means for the individual film strips separate the individual film strips by opaque lines running parallel thereto, so that the final display is, in fact, a composite or grid-type picture made up of separate linear elemental parts extending across one dimension of the display and generally separated by narrow, dark lines.

Another object is to provide a film strip in the form of a transparency for use in displays of this type, and which has substantially opaque lines printed, or otherwise purposely placed, thereon so as to extend longitudinally thereof, and which lines will be parallel to each other and the opaque lines provided by the film-supporting means of the sign when the film is engaged therewith. These opaque lines applied to the film are substantially the same width as the opaque lines provided by the film-supporting means of the sign, and are so disposed relative to each other, and the opaque lines formed by the film supports, as to leave transparent lines of equal width and, as the result of which, the apparent grid formation of the sign is reduced.

Another object is to provide a display sign of the type described wherein each film strip is illuminated by its own individual light source, so that more than enough illumination is available and, as the result of which, burned-out lamps may be readily changed from the front of the sign by merely removing the one film strip in front thereof.

And, a further object is to provide a method of producing a display sign of the type described which is capable of being rapidly carried out with existing equipment by unskilled labor and thus overcome the tremendous difficulties inherent in known methods of making large size transparency reproductions from commercial size originals.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings, in which:

Figure 3:
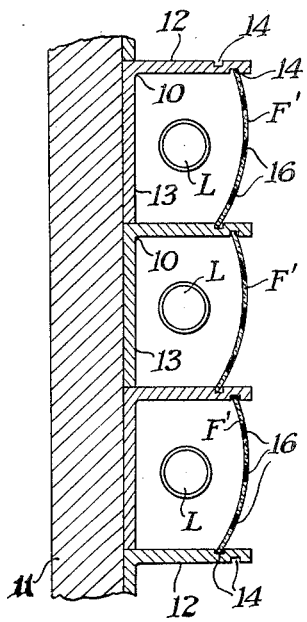
Fig. 3 is a partial vertical section taken through a display sign constructed in accordance with a preferred embodiment of the present invention.
Figure 7:
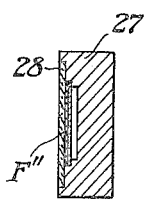
Figure 6:
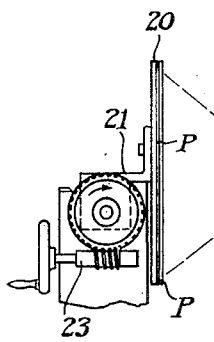
Fig. 6 is a side elevational view of the apparatus shown in Fig. 5.
Figure 8:
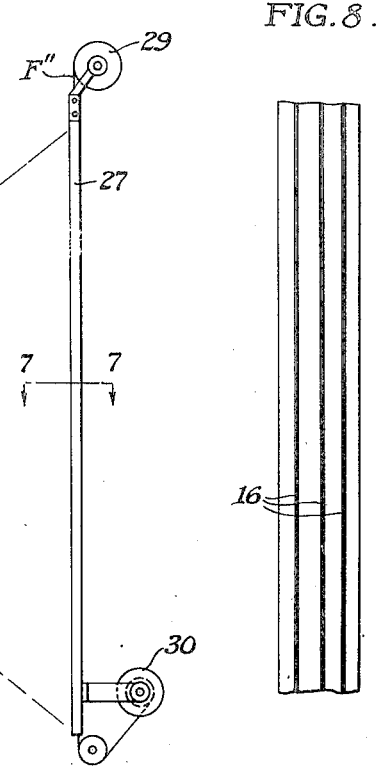

Fig. 7 is an enlarged horizontal section taken substantially on line 7—7 of Fig. 6; and Fig. 8 is an elevational view of a film strip used in the present display, and showing the form and disposition of opaque lines purposely applied thereto for the purpose of reducing the appearance of the grid pattern on the final display, and, in this instance, particularly disposed to account for the arcuate disposition of the film strips in the supporting means of the particular embodiment of sign disclosed in Fig. 3.

It has been adequately shown by recent development work on grid-type pictures that it is not necessary that a complete picture be present in order that the subject appear continuous and the definition adequate. In other words, composite pictures, or pictures made up of elongated elements extending across one dimension of the picture and which may, or may not, be separated from one another, are perfectly satisfactory to an observer when viewed at a distance greater than some minimum which can be determined mathematically for the case where the elements are separated.

Figure 2:
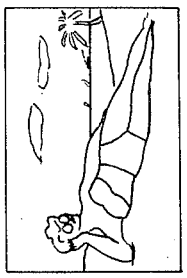
Fig. 2 is a schematic view of a small-size original display from which the large-size transparency is made.

I propose to make a large sign display in the form of a transparency, preferably color, by breaking a small, or commercial size, picture of the display up into a plurality of narrow, elongated elemental areas extending across one dimension of the display, and making individual enlargements of each of these elemental areas on separate strips of 35 or 16 mm. photographic color film. These film strips, after being processed to color transparencies in the usual manner, and on conventional equipment for handling this type film in strip form, are then reassembled in side-by-side relation in proper order in front of a light source and will, in combination, produce an enlarged color transparency which is a true reproduction of the original display. For example, suppose it was desired to make a 20 foot by 25 foot color transparency from an 8 inch by 10 inch original display of the type shown in Fig. 2 which can be a photographic print, a line drawing, or a transparency. The first step would be to scan it in parallel elemental areas extending across one dimension of the print and make an enlarged photographic reproduction of each elemental area at 30 times magnification on separate strips of 35 or 16 mm. color motion picture film 25 feet in length. The width of the elemental areas of the picture scanned will be determined by both the definition required in the final display and the magnification factor of the enlargement as compared to the width of film strips onto which the elemental areas are to be exposed. While the original display may be broken up into elemental areas which extend vertically or horizontally of the display, it is preferable to have the elements extend in the direction of the long dimension of the original, as shown, since the length of the film strips then take care of this dimension and fewer strips are required to make the complete display.

Figure 1:
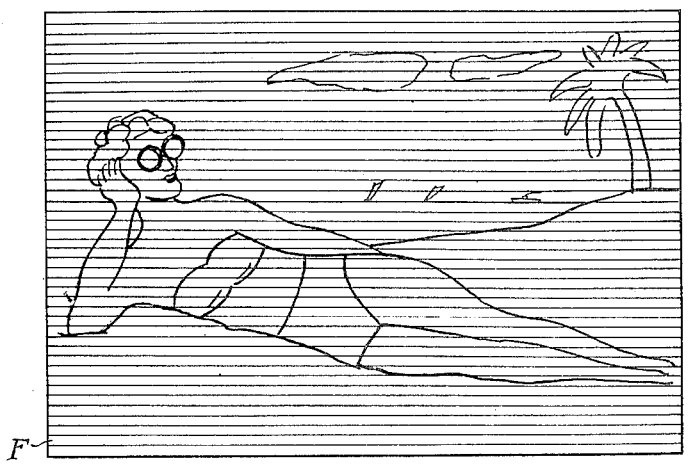
Fig. 1 is a schematic view illustrating how a large-size transparency constructed according to present invention might appear from a normal viewing distance.

After the exposed film strips are processed to color transparencies, they are then reassembled in side-by-side relation in a viewing plane so that, in combination, they will reproduce the original display when viewed simultaneously by transmitted light. In Fig. 1 I have schematically illustrated what the enlarged reproduction might look like, although the scale between the two, mentioned by way of illustration, has not been carried out for obvious reasons of space limitation. The final sign is made up of a plurality of film strips designated "F," each of which constitutes a transparency of an elemental area of the original display. The bottom strip of film would represent the elemental area at the bottom of the original 1/30 the width thereof, while the next strip of film will represent the next adjacent elemental area of the original, and so on throughout the width of the original display and the enlarged reproduction thereof.

Supposing film strips 16 mm. wide were used in making the enlarged transparency of the dimensions mentioned, by way of example, then if the film strips were unperforated and placed in edgewise abutment, as indicated in Fig. 1, approximately 780 film strips, each 25 feet in length, would be required. Obviously, the scale permissible in the drawing does not permit 780 lines to be shown across the picture in Fig. 1. If 35 mm. film were used, then less than half the number of strips would be required to provide the 20-foot dimension of the enlarged display. While in Fig. 1 the individual film strips "F," making up the enlarged display, are indicated as being in edgewise abutment, the same apparent result can be obtained with very little loss of definition of the subject matter, if the individual film strips are actually separated by opaque linear areas of substantial width. In such a case, the resulting enlarged transparency would appear as a grid-type composite picture which, when viewed by transmitted light from some appreciable distance (as a sign of this size would be) would appear as a continuous tone picture, the grid lines between the individual film strips disappearing because of the spreading action of transmitted light coming through narrow juxtaposed slits.

In the preferred form of my invention, this large transparency or display sign is made up in the form of a grid, or with the individual film strips separated from one another, since it readily solves the problem of mounting the strips in position on a support so that they can be readily and easily put in, and removed from, the supports as occasioned by the desired change of display, changing a burned-out lamp, etc.

Figure 4:
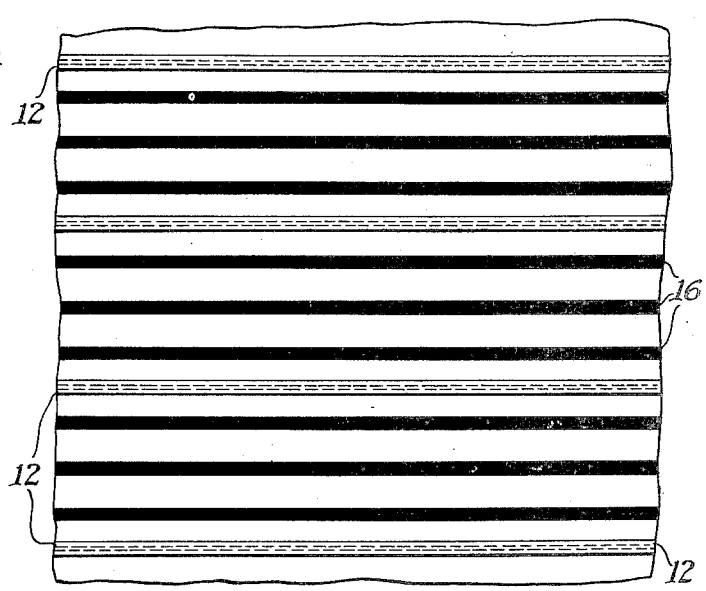
Fig. 4 is a front plan view of that portion of the sign shown in Fig. 3, it being pointed out that this view shows only a small part of the entire sign area.

Referring now to Figs. 3 and 4, the sign constructed in accordance with a preferred embodiment of my invention comprises long lengths of L-shaped channel stock 10 which are mounted on a supporting surface 11 in parallel side-by-side relation, so that the limbs 12 of each two adjacent L-shaped channels are spaced from one another and with the limb 13 of one thereof forms U-shaped recesses slightly longer than one dimension of the final sign. The limb 12 of each L-shaped member contains two small grooves 14, one on each face and near the end of the limb, which are adapted to engage the edges of the film strips F', as shown in Fig. 3. The dimensions of the L-shaped members are such that ordinary 16 or 35 mm. unperforated color film can be fed into the grooves, as shown, and be retained in extended covering relation with the U-shaped recesses. The grooves 14 are open at one end of the L-shaped members to allow the film strips F' to be readily slid into and out of position from one end of the channels by any suitable loading fixture, or by merely inserting the leading end of the film strips into the grooves and pulling or pushing them along from one end.

For illuminating the film strips F' after they are threaded into the sign, one or more electric lamps L are mounted in each U-shaped recess behind the film position. While different types and numbers of lamps may be used for this purpose, I have found that a long length of regular neon, fluorescent or cold-cathode type of gaseous discharge lamp can be used to advantage, since then only one lamp is required for each film strip. Such lamps have relatively cool operating charwhich the film "F" is guided at its edges only and held flat by a glass plate 28, see Fig. 7. The unexposed film is supplied from a supply reel 29 and the exposed film is taken up on a take-up reel 30.

The original is intermittently moved a step at a time behind the scanning slit from one side of the print to the other. Each elemental area of the picture is exposed on a length of film which is intermittently fed into exposing position in timed relation with the scanning of the print. It will be understood that the film gate must be in a darkroom protected from the light of floodlights 25. This can be readily accomplished by mounting the film gate in a darkroom, the projection lens 26 in the wall or door of said room, and the copyboard in another room which is lighted. Of course a shutter of some sort, not shown, should be provided on the lens to control the exposure and cut off the light from the film during the time the print is being indexed relative to the scanning slit and during the time a new length of film is being fed into exposure position. If desired, the gate can be provided with a suitable mask to print the separate dark stripes 16 on the film strips as mentioned above. As the different lengths of film are moved into and out of exposure position, they should be suitably numbered or otherwise coded to permit them to be reassembled in proper order for viewing after being processed.

After the entire print has been scanned and exposed, the exposed roll of film is processed to a transparency in conventional processing equipment adapted for handling color motion-picture film in strip form. The processed film is then cut up into the individual lengths representative of the scanned elemental areas of the original. These separate film strips are then threaded into the channels of a sign of the type described using the code numbers, or other code data, to insure their being assembled in the sign in the proper order and dispositioned to reproduce the original print on an enlarged scale. It should be understood that the scanning of the original picture will take into account the grid structure of the sign into which the film strips are to be threaded.

A display sign constructed according to the present invention provides an ideal way for wiping in a picture. Since each film strip is provided with its own elongated light tube, the tube array can be turned on in a sequence by an appropriate electrical circuit, thus the picture can be wiped very smoothly in from the top or bottom as one desires. Also, if one wishes to sacrifice somewhat the nearly perfect definition provided by a sign of this type, several different pictures can be put on such a sign for sequential showing. With a series of vertical slots over the channel array in the same fashion as a grid in the composite picture sense, several pictures could be placed on each strip of film longitudinally thereof. However, provision would have to be made to illuminate those coherent parts of a single picture for observation, rather than having long light tubes. Small electric lamps, i. e., flashlight lamps, could be mounted in series in the troughs and the circuits thereof arranged to illuminate only those at any one time which made up a complete picture. From the above description it will be apparent that the advantages of this type of display sign and the method of making the same are numerous. Principally, however, its primary advantage lies in the use of a standard color product and presently available facilities for machine processing the film. Transportation of finished large signs to location is greatly facilitated, as is also the changing of sign subject matter, and the maintenance of a given sign.

Although I have shown and described certain specific embodiments of my invention, I am fully aware that many modifications thereof are possible. My invention therefore is not to be limited to the specific details of the embodiments thereof disclosed by way of illustration, but is intended to cover all modifications coming within the scope of the appended claims.

Having thus described my invention, what I claim is new and desire to secure by Letters Patent of the United States is:

1. A composite display sign of the type described comprising in combination a plane supporting surface, a plurality of narrow, elongated channel-shaped members mounted in side-by-side relation on said supporting surface with their bases engaging said surface, electric lamps disposed in each of said channels, means on the inside wall of each arm of said channels for engaging and retaining the opposite edges of an elongated, narrow film strip, and an elongated, narrow, transparent strip of exposed and processed photographic film held in extended relation across the arms of each of said channels by said film-engaging means on the arms thereof, each of said strips of film constituting a photographic transparency bearing a photographic image depicting a different elongated elemental part of a complete picture and whose length extends completely across one dimension of the picture and whose width is a small fraction of the dimension of the picture orthogonally related to the first-mentioned dimension, said strips of film arranged so that when viewed simultaneously by transmitted light they form the complete picture.

2. A composite display sign of the type described comprising in combination a plane supporting surface, a plurality of like L-shaped members fixed to said support in side-by-side relation with one arm of each engaging the surface, and the other arm of each extending therefrom in parallel spaced relation to each other to form elongated, narrow channels on said surface in side-by-side parallel relation, an electric lamp disposed in each of said channels, each face of the spaced parallel arms of said L-shaped members provided with grooves extending the full length of said channels, and an elongated, narrow transparent strip of exposed and processed photographic film held in extended relation across each channel formed by said arms of said L-shaped members by having opposite longitudinal edges thereof confined by said grooves in said arms, each of said strips of film constituting a photographic transparency bearing a photographic image depicting a different elongated elemental part of a complete picture and whose length extends completely across one dimension of the picture and whose width is a small fraction of the dimension of the picture orthogonally related to the first-mentioned dimension, said strips of film arranged so that when viewed simultaneously by transmitted light they form the complete picture.

3. A composite display sign according to claim 2 characterized by the fact that one and the same end of each of said grooves in the arms forming said channels is open so that said film strips may be fed endwise into and out of said channels from one end thereof.

acteristics and will not damage the film by heat. Furthermore, if such lamps are frosted, a very satisfactory even, diffuse illumination of the entire length of the film strips is obtained.

It will be appreciated that the ends of the limbs 12, when viewed from the front of the sign, will appear as opaque lines separating the individual film strips F', thus making the display one of the composite or grid type. It has been shown, however, that so long as the film strips F' are viewed by transmitted light, the spreading action of the light passing through the transparent films will tend to completely obliterate the appearance of the opaque lines, separating the same when viewed from a reasonable distance. While the U-shaped channel recesses could also be formed by mounting U-shaped channel members in side-by-side relation on the supporting surface 11, such an arrangement would present the disadvantage that then two limbs, similar to 12, would be adjacent to one another, and the width of the dark line separating the individual film strips would be doubled.

As will be clear from an inspection of Fig. 3, in order to keep the width of the limbs 12 of the L-shaped members to a minimum, the grooves 14 in opposite faces of each are offset from one another. This results in the film strips F', when threaded thereinto, having their two longitudinal edges offset from one another so that the bow of the strips is not truly spherical but is slightly aspherical. However, I have found that this slight bowing of the film, and particularly the aspheric nature thereof, has no undesirable distortion effect on the display when the display is observed from a reasonable viewing distance, and that, for all practical purposes, the visual results are the same as if all of the film strips were mounted perfectly flat in a single viewing plane.

I have found that when very high contrast subjects or highlight areas on normal subjects are viewed on a sign display of this type, the dividing lines between the picture elements, formed by the ends of limbs 12 of the film supports, are sometimes too conspicuous. This difficulty can be eliminated by placing more lines of the same width in the display by printing, or otherwise placing, properly spaced opaque stripes or lines directly on the film strips. The presence of more dark lines in the composite picture serves to bring into operation that spreading of light transmitted through a narrow slit separated by dark areas which has made possible the general use of composite pictures. This additional spreading of light allows the eye to make a better overall integration of the transparent film areas, thus reducing one's awareness of the line structure. Although the presence of more dark lines reduces the brightness of the picture somewhat, this is not a detriment, since the level of illumination possible with a display of this type is normally above that considered to be comfortable to an observer.

In Figs. 3 and 4 I have shown each of the film strips F' provided with three of these additional dark or opaque stripes 16. As shown, the width of these stripes 16 should be equal, or substantially so, to the width of the limbs 12 which also provide dark lines in the composite picture. The number of stripes 16 required will vary with the width of the film strips used and the type of subject to be displayed. Using 16 mm. film and limbs 12 approximately 1/8" wide, I have found three stripes 16, spaced across each strip of film, to give very satisfactory results. Regardless of the number of stripes that are used, for the best results it is necessary that they be so disposed on the film strips relative to each other and the edges of the film that when the film strips are threaded into the sign, the widths of the transparent areas between each pair of dark lines on the complete display, whether they be between two adjacent stripes 16 on the films or between one of the outermost stripes 16 on the film and the end of a limb 12, be substantially equal. In order to attain this result when the film strips F' are mounted in the channels in a bowed fashion of aspheric curvature, as shown in Fig. 3, it is necessary that the width of the spacing of the stripes 16 on each film strip F' vary across the width of the film strip, as shown in Fig. 8, so that the transparent areas will appear of equal width when films are mounted in the sign.

One method of making a large transparency sign display in accordance with the present invention is to mount a plurality of unexposed, narrow film strips in side-by-side relation on a supporting structure in exactly the same way in which they are to be finally mounted for viewing. The length and number of film strips will be dictated by the dimensions required in the final display and, of course, the film strips will be set up in a dark room. Then, an image of the small-size original is projected onto these film strips at the proper magnification to expose the same. After the film strips are numbered, or otherwise coded as to position, they are taken off the support, spliced end-to-end, and run through a conventional processing machine of the type used to process color motion-picture film. After being processed to transparencies, the film strips are separated from one another and reassembled in a viewing plane in their proper order for viewing by transmitted light.

Another method of making a large transparency of the type in question which I believe to be preferably over that described, in that it reduces the handling of the film required, and requires simpler and more available exposure equipment, will now be described by reference to Figs. 5–7. According to this method, the original is scanned a line at a time and each line as it is scanned is projected at proper magnification onto a separate unexposed film strip moved in proper lengths into an exposure plane from a supply reel. After exposure, the film strips are processed to a transparency, cut up into individual strips and threaded into the channels of the sign above described in the order in which they were exposed.

Figure 5:
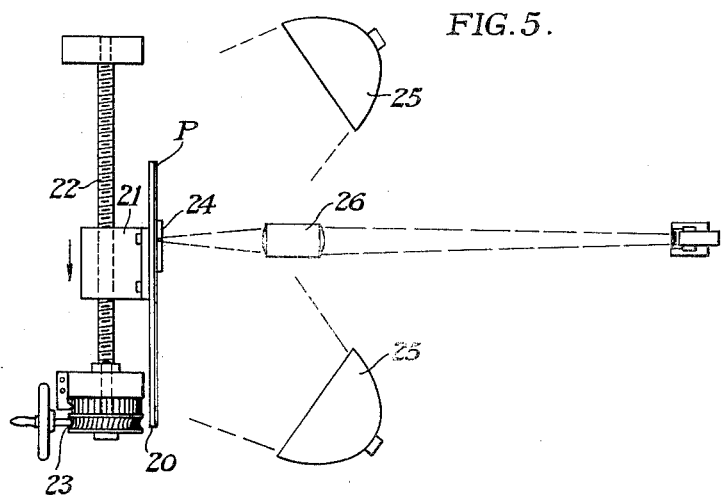
Fig. 5 is a diagrammatic view in plan showing apparatus used in exposing the film strips forming a part of the present display in accordance with a preferred method of reproduction.

Referring now to Figs. 5–7, one way of carrying out this method is to mount the original reflection-type print "P," that is to be reproduced, on a copyboard 20, fixed to a carriage 21 mounted on a screw 22 which can be accurately adjusted by means of a manually controlled indexing mechanism 23. This carriage and copyboard move transversely behind a scanning slit 24 which stands across one dimension, generally the long one, of the original and defines the elemental areas of the original to be exposed on separate film strips. The scanning slit 24 and that element of the original therebehind is illuminated from the front by floodlights 25. The element of the original print "P" behind the scanning slit at any one time is projected with the desired magnification by a projection lens 26 and onto a length of film F'' held in the exposure plane by a suitable gate structure. This gate structure may comprise a channeled member 27 in 4. A composite display sign of the type described comprising a plurality of elongated, narrow strips of photographic film exposed and processed to a transparency, each strip of film bearing a different linear elemental part of the complete display running lengthwise thereof, a bank of electric lamps, means for supporting said individual strips of film by their longitudinal edges in parallel spaced relation substantially in a common viewing plane in front of said bank of lamps so that the elemental parts of the display borne thereby are separated by opaque lines of substantially equal width and combine to form the complete display when viewed simultaneously from the front by transmitted light, each of said film strips having at least one substantially opaque line running the length of the picture area thereof, said opaque lines being substantially the same width as the opaque lines separating said individual strips of film and disposed to lie parallel with said separating lines and in combination therewith to leave linear transparent areas on said film strips over the entire display which are narrower than the film strips themselves and are substantially equal in width.

5. A film strip for use in a composite display sign of the type described comprising an elongated, narrow strip of photographic film exposed and processed to a transparency including a visible photographic image which constitutes a linear elemental part of a complete display of which it is adapted to form a part, said transparency also including a substantially opaque line extending the full length thereof in parallel relation to its edges and obscuring the portion of said image which it overlies, said line having a width which is a small fraction of the entire width of the film strip.

6. A film strip for use in a composite display sign of the type described comprising an elongated, narrow strip of photographic film exposed and processed to a transparency which constitutes a linear elemental part of a complete display of which it is adapted to form a part, said transparency including a visible photographic image and a plurality of substantially opaque lines of equal width extending the full length thereof in parallel relation to its edges and obscuring the portion of said image which they overlie, said lines having a width which is a small fraction of the entire width of the film strip and being equally spaced from one another.

7. The method of making a large composite display sign of the type described from a small-size original of the display comprising the steps of photographing by projection printing different parallel linear elemental areas extending completely across one dimension of the original onto separate, elongated, narrow strips of photographic film with the desired magnification so that each film strip contains a latent image of a different but equal size linear elemental area of the original, processing said exposed film strips to transparencies including a photographic image depicting a linear elemental part of the complete display, and mounting said processed film strips in parallel side-by-side relation substantially in a common viewing plane and in such order that the photographic images carried by the several strips combine to form a composite reproduction of the original display when viewed simultaneously by transmitted light.

8. The method of making a large composite display sign of the type described from a small-size original of the display comprising mounting a plurality of elongated, narrow strips of photographic film in side-by-side parallel relation substantially in a given exposure plane, the lengths of the strips being such as to satisfy one dimension of the final composite display and the number of strips and their lateral disposition satisfying the other dimension, projecting an enlarged image of the original display onto said strips of film, removing said exposed strips from the exposure plane and processing them in strip form to transparencies including photographic images of a mirror portion of the complete display, then rearranging said processed strips of film in a viewing plane in the same order and relative disposition they had when in the exposure plane so that they can be viewed by transmitted light.

9. The method of making a large composite display sign of the type described from a small-size original of the display comprising the steps of scanning the original display in linear parallel elemental areas extending across one dimension thereof, projecting enlarged images of the scanned elemental areas onto an exposure plane, moving lengths of a continuous film into exposing position in said exposure plane as the film is scanned, processing said exposed film in continuous strip form to a transparency including photographic images of different linear portions of the original display, after processing cutting said film up into lengths corresponding to the scanned linear elemental areas of the original, and mounting said cut-up film strips in side-by-side parallel relation in a common viewing plane in such order that when viewed simultaneously by transmitted light, the elemental parts of the display carried by each will combine to form an enlarged reproduction of the display.

10. A composite display sign comprising a plurality of elongated narrow transparent strips of exposed and processed photographic film, each strip of film constituting a photographic transparency bearing a photographic image depicting a different elongated elemental part of a complete picture and whose length extends completely across one dimension of the picture and whose width is a small fraction of the other dimension of the picture, means for supporting said individual strips of film in side-by-side relation substantially in a common viewing plane so that the photographic images borne by the several strips combine to form the complete picture when viewed simultaneously, and including a plurality of parallel arms spaced from each other slightly less than the width of said film strips, and means on the opposed surfaces of each pair of spaced arms engaging the opposite edges of one of said film strips and holding the strips in an extended and substantially flat condition, and a lamp disposed between each pair of spaced parallel arms to the rear of said supported film strips for illuminating said strips by transmitted light.

FORDYCE E. TUTTLE.

References Cited in the file of this patent

UNITED STATES PATENTS

| Number | Name | Date |
|---|---|---|
| 1,640,830 | Hunt | Aug. 30, 1927 |
| 1,809,378 | Eschenbach | June 9, 1931 |
| 1,888,377 | Eschenbach | Nov. 22, 1932 |
| 2,145,946 | Morrissey | Feb. 7, 1939 |
| 2,318,596 | Davenport | May 11, 1943 |